Dec. 12, 1944.　　　　E. A. SMITH　　　　2,364,826
APPARATUS FOR ARC WELDING
Filed March 16, 1943　　　2 Sheets-Sheet 1
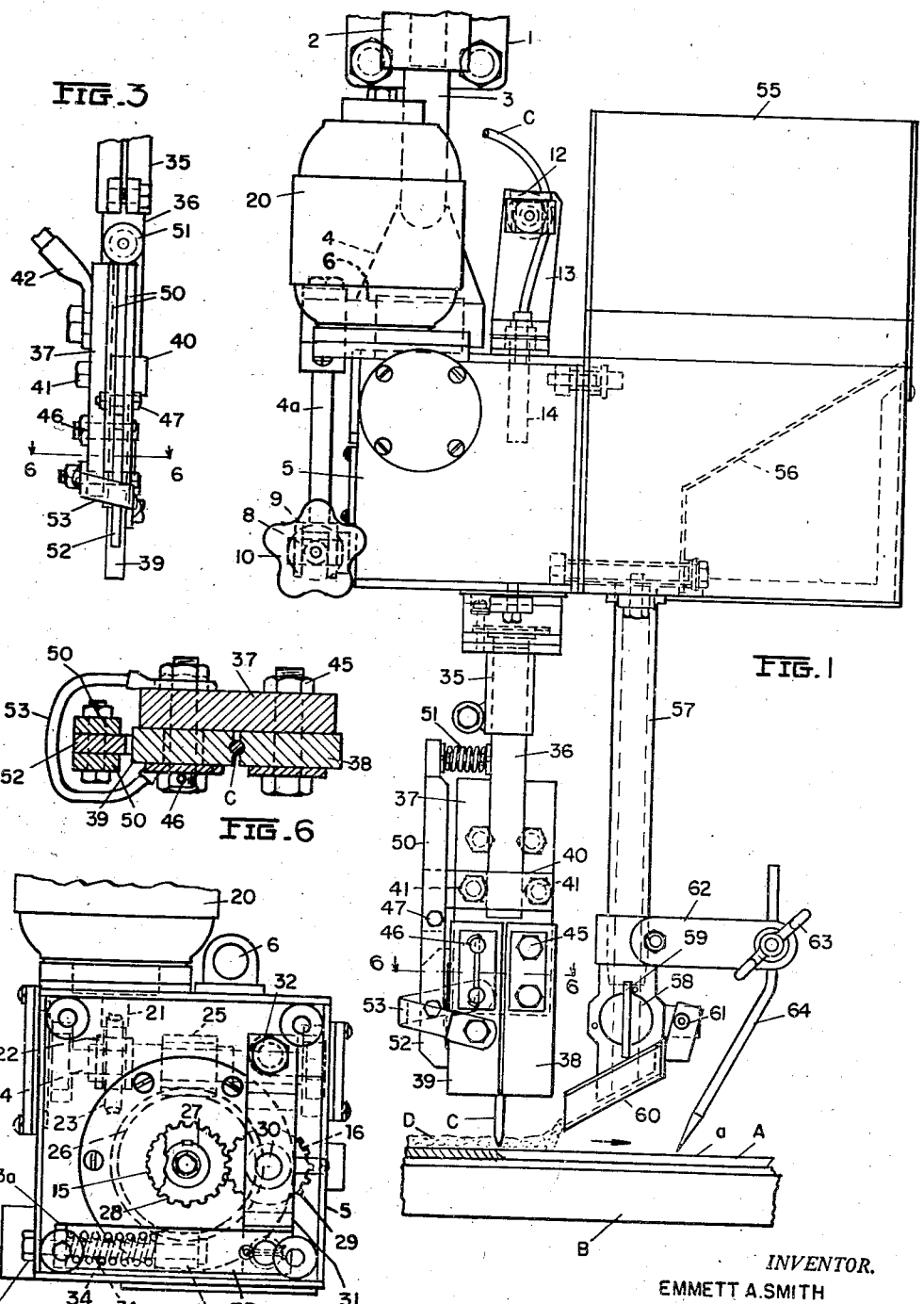
INVENTOR.
EMMETT A. SMITH
BY
Oberlin, Limbach & Day
ATTORNEYS Dec. 12, 1944.  E. A. SMITH  2,364,826
APPARATUS FOR ARC WELDING
Filed March 16, 1943  2 Sheets-Sheet 2

INVENTOR.
EMMETT A. SMITH
BY
Oberlin, Limbach & Day
ATTORNEYS

Patented Dec. 12, 1944

2,364,826

UNITED STATES PATENT OFFICE 2,364,826

APPARATUS FOR ARC WELDING

Emmett A. Smith, East Cleveland, Ohio, assignor to The Lincoln Electric Company, Cleveland, Ohio, a corporation of Ohio Application March 16, 1943, Serial No. 479,349

5 Claims. (Cl. 219—8)

The present improvements relating as indicated to apparatus for arc welding have more particular regard to the provision of such an apparatus in which a flexible metallic weld rod or wire is automatically fed to the work, such wire being connected with one side and the work with the other of a generator or equivalent source of welding current. The apparatus also includes associated means for supplying to the work along the line thus to be welded a suitable flux composition, preferably in the form of a powdered or granular material.

Numerous devices of the type in question have been patented and certain thereof put into commercial use, but all with which I am acquainted are more or less complicated in construction with parts that are liable to get out of order incident to the rough handling to which the equipment is necessarily subject in the shop or in the field; furthermore, the adjustment and control of such apparatus when in operation, while nominally automatic in character, has fallen far short of achieving its end.

One principal object, accordingly, of the present improvements is to provide an apparatus of the the character in question which will be extremely simple and sturdy in construction and involve a minimum number of operating parts.

A further object is to provide such an apparatus which will be capable of use under a wide variety of conditions. More particularly, with reference to the means provided for supplying the layer of flux to the work, such means are designed to provide instant and yet sufficiently exact control of the flow of the granular flux material to suit the particular operation and without interfering in any way with the essential welding operation.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation of an arc welding apparatus embodying the present improvements;

Fig. 3 is an end elevation of the lower portion of the apparatus as viewed in the opposite direction, viz. from the left in Fig. 1;

Fig. 5 is a similar view of such driving mechanism and parts, viewed from the same side as in Fig. 2;

Fig. 6 is a transverse section of the lower part of the welding apparatus proper, the plane of the section being indicated by the line 6—6 on Figs. 1 and 3.

Figure 7:
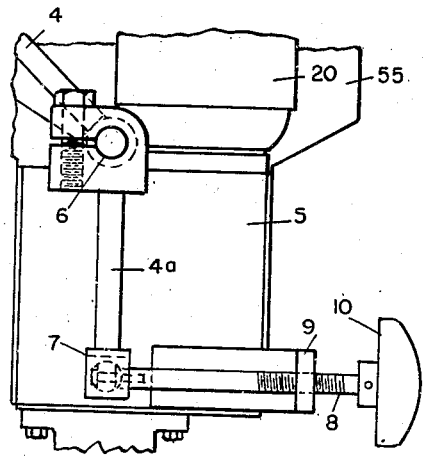
Fig. 7 is a side elevation of a detail as viewed from the left in Fig. 1.
Figure 2:
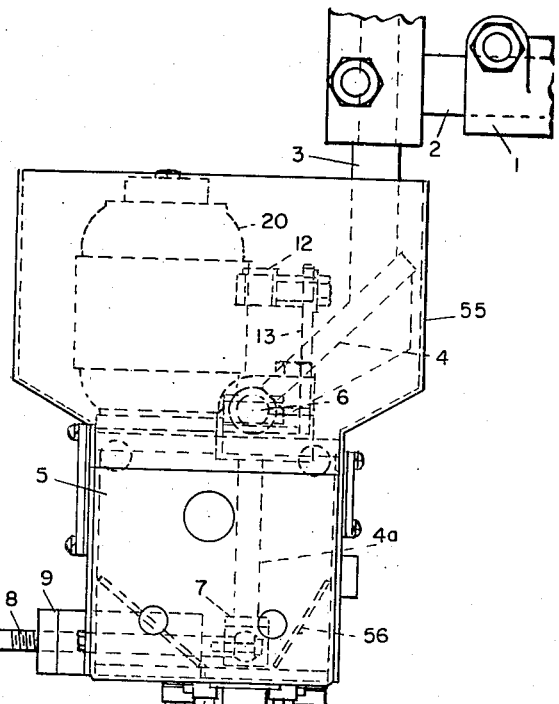
Fig. 2 is an end elevation thereof as viewed from the right in Fig. 1.
Figure 4:
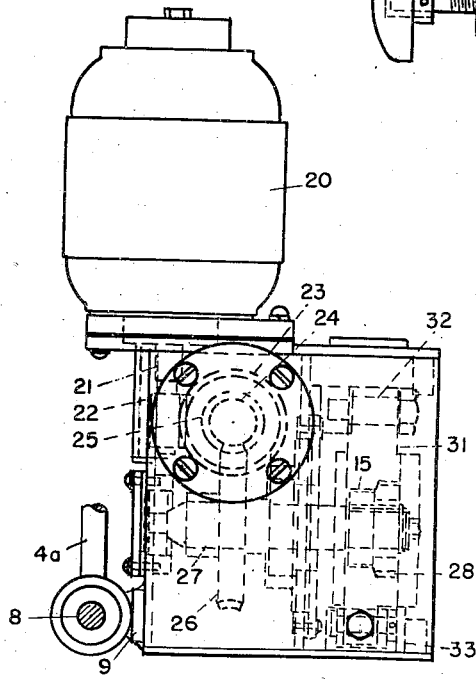
Fig. 4 is a side view corresponding to that of Fig. 1, showing the drive mechanism and other parts which are contained within the housing forming the upper part of the welding apparatus proper.

As illustrated in Fig. 1, the apparatus as a whole is mounted so as to depend above the work A and to traverse the line $a$ along which the welding metal is to be deposited from the weld rod C. The work will usually consist of two metal parts, such as plates, brought into juxtaposition, and the line to be welded will be that along which such plates adjoin each other. Such parts or plates will rest upon and are suitably clamped to a support B and the traversing movement of the weld rod may be secured either by moving such support or the apparatus which feeds the weld rod C to the work. In either event, the layer of flux D will be deposited just in advance of the lower end of the weld rod between which and the work the arc is struck whereby such end is continuously melted off and interfused with the adjacent edges of the parts or plates comprising the work.

In the illustrated construction the apparatus is supported from a mounting bracket 1 which may either be stationary or carried by suitable traversing mechanism (not shown) as the case may be. Secured in such bracket for adjustable movement transversely of the line to be welded is an arm 2 in the outer end of which is rotatably adjustably secured a stub shaft 3. The lower end of the latter fans out into a plate or bracket 4 which carries the welding apparatus proper together with the flux feeding device, all as will now be described.

The weld rod or wire feeding mechanism, which comprises one main part of such welding apparatus, is contained in a box-like housing 5 which is hung for oscillatory movement about bracket 4 on bearings 6. Rigidly depending from bracket 4 adjacent one rear corner of the housing, as viewed in Fig. 1, is an arm 4a, to the lower end of which is connected by means of a hinged joint 7 one end of a shaft 8 which lies along one side of such housing and has threaded engagement with a bracket 9 attached to the lower forward corner thereof, as viewed in Fig. 1. The corresponding end of the shaft which projects forwardly of the housing, carries a handle or knob 10, conveniently disposed to be grasped by the operator for the purpose of rotating said shaft 8. As will be obvious, movement of the latter in one direction or the other will serve correspondingly to oscillate the housing 5 about its pivotal support 6.

The weld rod C as it is received by the apparatus, as by being unwound from a suitable reel (not shown) is first conducted over a guide roll 12 carried by an upwardly projecting arm 13 on the upper face of housing 1 and is thence guided through a tube or bushing 14 which extends downwardly within the housing. This guide tube is preferably thus removably secured in the upper wall of the housing in order to permit replacement should it become worn by the passage of the weld rod therethrough or in order to accommodate weld rod or wire of different diameters. Immediately below the guide tube 14 are two similar feed rolls 15 and 16 between which the rod or wire is gripped under sufficient pressure to be drawn downwardly and fed to the work through the electrical contacts which form the lower part of the apparatus, as will be presently described. Said rolls 15 and 16 will preferably have knurled or corrugated cylindrical faces so as to positively engage with opposite sides of the wire so as thus to feed the same at a predetermined rate depending upon the rate at which the rolls are driven.

For the purpose of thus driving the rolls, a suitable electric motor 20, mounted on the upper face of the housing 1, is employed. The spindle 21 of the motor projects within the casing and is connected by a worm 22 with a worm gear 23 mounted on a transverse shaft 24. The latter in turn is connected by means of a worm 25 with a worm gear 26 on a second shaft 27, which is disposed at right angles to and beneath the first and which in addition carries feed roll 15, as well as a spur gear 28 that meshes with a spur gear 29 on the spindle 30 which carries the second feed roll 16.

This spindle 30 is mounted for limited swinging movement toward and from shaft 27 by being journalled in a frame 31, the upper end of which is pivoted about a pin 32. Connected with the lower end of said frame is a link 33 with which in turn is associated a compression spring 34 that tends to draw such frame in the proper direction to press feed roll 16 against feed roll 15.

As shown in Fig. 5, said spring 34 surrounds a bolt 34a that is aligned with link 33 and slidably passes through an apertured lug 33a on the outer end thereof, the spring being interposed between such lug and a nut 34b, closed at one end, that is threaded on the inner end of said bolt. The head 34c on the outer end of the bolt will be held against the adjacent wall of casing 5 by a spring; while the threaded inner end of the bolt is designed to bottom in nut 34b, such end being ground off to adjust the compressive action of the spring, so that the feed rolls 15 and 16 will engage weld-rod or wire of smallest diameter with requisite pressure to feed the same properly. When a larger size, and correspondingly stiffer, rod is being fed, the feed rolls 15 and 16 should engage the same with correspondingly greater pressure, and this is automatically accomplished without requiring any adjustment of the parts involved, since introduction of such rod will increase the displacement of feed roll 16 from feed roll 15 and thereby compress spring 34 by a corresponding amount.

Suitably attached to the under face of housing 5, in line with the path of travel of the weld rod or wire as it leaves the feed rolls 15 and 16, is a clamp in the form of a split bushing 35 in which is vertically adjustably secured a tube 36 through which said weld rod or wire is guided in its further passage downwardly to the work. Against one face of the tube 36 which is slightly flatted, there is clamped a metal plate 37 which carries at its lower end two contact members 38 and 39 between which the weld rod finally passes before it emerges into the welding zone. Plate 37 is conveniently thus clamped to the tube by means of a bar 40 which engages the opposite side of the latter, the bar and plate being drawn together by means of screws 41. The welding current is supplied to such plate 37 and thus to the contact members in question by means of a conductor 42 attached to the outer face of the plate near its upper end. It will be understood that insulation will be provided at suitable points so that the flow of such current will be only to the contact members and thus to the electrode where it passes in contact therewith. For example, such insulation may be incorporated in the attachment whereby the clamp 35 is secured to the under face of the housing 5.

The one contact member 38 is fixedly secured to the plate 37 as by screws 45; the other member 39, however, is secured to the plate by means of pins 46 in the one member and slots in the other so that said member will be capable of limited movement toward and from the other. Pivotally attached at an intermediate point to plate 37, as by a pin 47 passing through a projecting end of bar 40, is a lever 50, the upper end of which is forced outwardly by a compression spring 51 that bears against a seat on the adjacent side of tube 36. Pivotally attached to the lower end of the lever is a rocker 52 which lies alongside the adjacent edge of contact member 39 and has bearing contact therewith at spaced points, as shown in Fig. 1. In order to ensure equal flow of current to said contact member 39 with that to member 38, a short flexible conductor loop 53 is attached at one end to said contact member 39 and at its other to the opposite face of plate 37.

Attached to housing 5, preferably at the forward face thereof having regard to the direction of relative movement between the apparatus and the work, is a flux hopper 55, the bottom wall 56 of which converges to an outlet opening, located adjacent such housing face, and is connected with a tube 57 that extends downwardly in substantially parallel relation with tube 36. Said hopper is electrically insulated from housing 5 by suitable insulation (not shown) interposed therebetween, and said tube 57 is likewise clear of contact with the tube 36, through which the weld rod or wire is fed downwardly to the work, and its lower end lies substantially in the same plane as do the contact members 38 and 39 carried by said tube 36.

A rotary valve 58 fitted in such lower end of tube 57 and provided with wings 59 to facilitate its adjustment serves either to close off such end or permit the flow in regulated amount downwardly through said tube of the flux composition contained in hopper 55. It will be understood that the flux designed to be used in the apparatus will be in powdered or granular form, such that it will tend to flow freely down the tube 57 from said hopper 55. The discharge of such flux from the lower end of the tube is further regulated by a gate 60 of transverse channel shape which is secured at one end to said tube about an axis 61. The lower end of the tube is cut off on a slant and said gate 60 is normally inclined at a corresponding angle; furthermore, the attachment of the gate about its pivotal axis is such that it will be frictionally held at whatever variant angle it may be placed. When in the position shown in Fig. 1, the gate will substantially cut off the discharge of flux from tube 57 even though valve 58 be fully open. However, by lowering the free end of the gate the flow of the material may be obtained at a desired rate to deposit a layer D thereof in the form of a windrow of desired depth and transverse extent.

Attached to tube 57 just above the control valve 58 therein is a forwardly projecting arm 62 in the outer end of which is adjustably held by means of a clamp nut 63 a pointer 64. This is in the form of a bent pencil-like rod, the lower end of which may be pointed, as shown. In use, this rod is set so that when the point is moved along a given path, e. g. over the line between the adjoining parts which are to be welded together or other line on the work, the lower trail end of flux gate 60 and the weld rod C will traverse the line to be welded. It will be understood that said pointer is not designed to engage with the work for in many operations, as in welding plates, the edges will be closely juxtaposed, but by vertically and rotatably adjusting such pointer in arm 62, the latter can be positioned so as to follow either the line of the weld or another line or other guide located alongside the line of weld.

Having thus described the construction of the various component parts of the apparatus and their individual operation, the operation of the apparatus as a whole will now be briefly set forth. Assuming the work-pieces A to be suitably placed and clamped if necessary on support B so as to bring the edges of such parts which are to be welded together into close juxtaposition, the bracket 1 which supports the apparatus will be moved to bring the lower portion of the latter over the weld line at one end thereof, with the parts arranged to move in the direction indicated by the arrow in Fig. 1. The principal lateral adjustment of the apparatus, in order thus to locate the seam, is attained by adjustment of shaft 2 in said bracket, and final adjustment, as well as such lateral shifting of the apparatus as may be required in order to follow irregularities in the weld line, is attained by rotating the screw 8 through the medium of handle 10.

The motor 20 it will be understood is reversibly operable so as to be capable of both advancing and retracting the weld rod C through the feed rolls in housing 1. Furthermore, the motor will be energized so that its rotation in magnitude and direction is responsive to variations in the voltage in the welding circuit with respect to the voltage of an adjustable standard. The means whereby the motor is thus energized form no part of the present invention and illustration of the circuit arrangement whereby the results just stated are accomplished is accordingly deemed unnecessary. Suffice to say that once the arc is struck in the usual manner between the lower end of weld rod C and the work it will be automatically maintained, the weld rod being fed downwardly at the proper rate for this purpose. As soon as the arc is struck, traversing movement between the apparatus and work is begun and simultaneously by opening valve 58 and proper adjustment of gate 60 a layer of flux is deposited just in advance of the weld rod and of such arc. The operator, standing in front of the apparatus, has only to see that the pointer 64 properly follows the line to be welded. With one hand he can then regulate the flow of flux as required to obtain the best results and with the other he can swing the apparatus transversely by movement of handle 10 so as to cause the weld rod to follow closely the line to be welded.

In addition to the foregoing general features of operation, special features contributing to safety of operation should be noted. Thus by insulating the side adjustment handle 10 the operator's hand used in turning said screw is insulated from ground in case his body or feet should come in contact with grounded work or fixture. Likewise insulation of the flux feeding mechanism from the housing 5 eliminates accidental grounding of such mechanism and thus of the operator as he from time to time may have to adjust the discharge of flux material onto the work. Finally, it will be noted that not only the feed rolls 15 and 16, but the entire train of gearing whereby they are driven, is enclosed within housing 5. As a result, not only is the operator safe from contact with revolving parts, but the bearings for such rolls and the driving mechanism therefor are protected from dirt.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In apparatus for metallic arc welding, the combination of a housing, opposed weld-rod feed rolls mounted therein, means on said housing for guiding the weld-rod to said rolls, a tube depending from said housing adapted to receive the weld-rod from said feed rolls and guide the same to the work, a plate attached to the lower end of said tube and connected with the welding circuit, two opposed contact members carried by said plate and adapted to engage the weld-rod therebetween, one of said members being mounted for movement transversely of the other, and resilient means urging said members together, said means including a lever lying alongside said plate and pivoted at an intermediate point thereto, a spring pressing outwardly against the upper end of said lever, and a rocker interposed between the lower end of said lever and said transversely movable contact member and having spaced contact with the latter.

2. In apparatus for metallic arc welding, the combination of a support mounted for traversing movement relatively to the work, an arm on said support adjustable transversely of the direction of such movement, a housing carried by said arm and oscillatorily adjustable about an axis parallel with such direction of movement, manually operable means carried by said housing for thus oscillatorily adjusting the same, and means carried by said housing adapted to feed the weld-rod downwardly therethrough.

3. In apparatus for metallic arc welding, the combination of a support mounted for traversing movement relatively to the work, an arm on said support adjustable transversely of the direction of such movement, a bracket rotatably adjustable about a vertical axis in said arm, a housing carried by said bracket and oscillatorily adjustable about an axis parallel with such direction of movement, manually operable means carried by said housing for thus oscillatorily adjusting the same, and means carried by said housing adapted to feed the weld-rod downwardly therethrough.

4. In apparatus for metallic arc welding, the combination of a support, a depending bracket rotatably adjustable about a vertical axis in said support, a housing carried by said bracket and oscillatorily adjustable about an axis transverse of said first-named axis, an arm depending from said bracket alongside said housing, a screw having threaded attachment to said housing and a universal joint connection with said arm, whereby upon rotation of said screw said housing may be oscillatorily adjusted, opposed weld-rod feed rolls mounted in said housing, means on said housing for guiding the weld-rod to said rolls, and a tube depending from said housing adapted to receive the weld-rod from said rolls and guide the same to the work.

5. In apparatus for metallic arc welding, the combination of a housing, opposed weld-rod feed rolls mounted therein, means on said housing for guiding the weld-rod to said rolls, a tube depending from said housing adapted to receive the weld-rod from said feed rolls and guide the same to the work, a flux hopper attached to said housing, a tube extending downwardly from said hopper for discharging flux on the work in advance of the welding operation, and means at the lower end of said tube adapted to regulate the rate of discharge of the flux therefrom, while still permitting free flow of the flux.

EMMETT A. SMITH.